United States Patent
Wada et al.

(10) Patent No.: US 8,176,290 B2
(45) Date of Patent: May 8, 2012

(54) MEMORY CONTROLLER

(75) Inventors: Takahisa Wada, Kanagawa (JP); Katsuyuki Kimura, Kanagawa (JP); Shunichi Ishiwata, Chiba (JP); Takashi Miyamori, Kanagawa (JP); Ryuji Hada, Kanagawa (JP); Keiri Nakanishi, Kanagawa (JP); Yasuki Tanabe, Tokyo (JP); Masato Sumiyoshi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 12/482,876

(22) Filed: Jun. 11, 2009

(65) Prior Publication Data
US 2010/0005271 A1  Jan. 7, 2010

(30) Foreign Application Priority Data
Jul. 4, 2008 (JP) ................... 2008-175825

(51) Int. Cl.
*G06F 13/00* (2006.01)
*G06F 13/28* (2006.01)
*G06F 15/76* (2006.01)
*G06F 7/00* (2006.01)
*G06F 17/00* (2006.01)

(52) U.S. Cl. ............ 711/170; 711/154; 711/E12.078; 712/22; 707/692

(58) Field of Classification Search ............ 711/170, 711/154, E12.078; 712/22; 707/692
See application file for complete search history.

(56) References Cited

U.S. PATENT DOCUMENTS
7,277,899 B1 * 10/2007 Salyzyn .................. 1/1
2006/0125843 A1 * 6/2006 Chen .................. 345/619

FOREIGN PATENT DOCUMENTS
JP 2001014219 A1 * 1/2001
JP 2004-21645 1/2004

OTHER PUBLICATIONS
U.S. Appl. No. 12/540,798, filed Aug. 13, 2009, Tanabe, et al.
U.S. Appl. No. 12/552,680, filed Sep. 2, 2009, Kimura, et al.
U.S. Appl. No. 12/559,962, filed Sep. 15, 2009, Hada, et al.

* cited by examiner

*Primary Examiner* — Edward Dudek, Jr.
(74) *Attorney, Agent, or Firm* — Oblon, Spivak, McClelland, Maier & Neustadt, L.L.P.

(57) ABSTRACT

A memory controller, on receiving a write request to write write-data into an address of a second memory region issued by a processor, determines whether read-data requested to be read from an address of a first memory region by the processor is matched with the write-data requested to be written into the address of the second memory region, and if the read-data is matched with the write-data, prevents the write-data from being written into the address of the second memory region.

15 Claims, 4 Drawing Sheets

FIG.5

| B | G | B | G | B | G |
|---|---|---|---|---|---|
| G | R | G | R | G | R |
| B | G | B | G | B | G |
| G | R | G | R | G | R |
| B | G | B | G | B | G |
| G | R | G | R | G | R |

MEMORY CONTROLLER

CROSS-REFERENCE TO RELATED APPLICATIONS

This application is based upon and claims the benefit of priority from the prior Japanese Patent Application No. 2008-175825, filed on Jul. 4, 2008; the entire contents of which are incorporated herein by reference.

BACKGROUND OF THE INVENTION

1. Field of the Invention

The present invention relates to a memory controller. More specifically, the present invention relates to a memory controller suitably applied to a method that, in response to a data write request from a processor, prevents overlapping data from being written into a memory.

2. Description of the Related Art

Image processing such as pixel interpolation, color conversion, contour correction, and filtering is performed on captured images output from a complementary metal oxide semiconductor (CMOS) sensor and the like, to improve the image quality. To perform such image processing at a high speed, a dedicated hardware such as an application specific integrated circuit (ASIC) is used.

To change specification of image processing with ease without changing the circuit configuration, there is a method of performing image processing by using software that operates on a single instruction multiple data (SIMD) processor. In the technology disclosed in, for example, Japanese Patent Application Laid-open No. 2004-21645.

However, in the method of performing image processing on a conventional processor, an input image read from a memory region A is transferred to the processor, and an output image that is obtained by processing the input image by the processor is stored in a memory region B as it is. Accordingly, even if a portion overlapping with pixel data of the input image is included in pixel data of the output image, such overlapping pixel data is also stored in the memory region B. Because the amount of memory to store therein the entire input image and the entire output image is required, thereby increasing the amount of memory.

BRIEF SUMMARY OF THE INVENTION

A memory controller according to an embodiment of the present invention comprises: a match determining unit that determines whether read data requested to be read from a first memory region by a processor is matched with write data requested to be written into a second memory region by the processor; and a write unexecuting unit that, if the read data is matched with the write data, prevents the write data from being written into the second memory region.

A memory controller according to an embodiment of the present invention comprises: a matching element setting unit that presets a portion where read data requested to be read from a first memory region by a processor is matched with write data requested to be written into a second memory region by the processor; and a write unexecuting unit that, in the write data requested to be written by the processor, prevents a portion set by the matching element setting unit from being written into the second memory region.

A memory controller according to an embodiment of the present invention comprises: a match determining unit that determines whether write data requested to be written into a memory by a processor is matched with data already stored in the memory; and a write unexecuting unit that, if the write data is matched with the data already stored in the memory, prevents the write data from being written into the memory.

BRIEF DESCRIPTION OF THE DRAWINGS

FIG. 5 is an example of data to which a matching element according to an embodiment of the present invention is set.

DETAILED DESCRIPTION OF THE INVENTION

Exemplary embodiments according to a memory controller of the present invention are described below in greater detail with reference to the accompanying drawings. The present invention is not limited to the following embodiments.

First Embodiment

Figure 1:
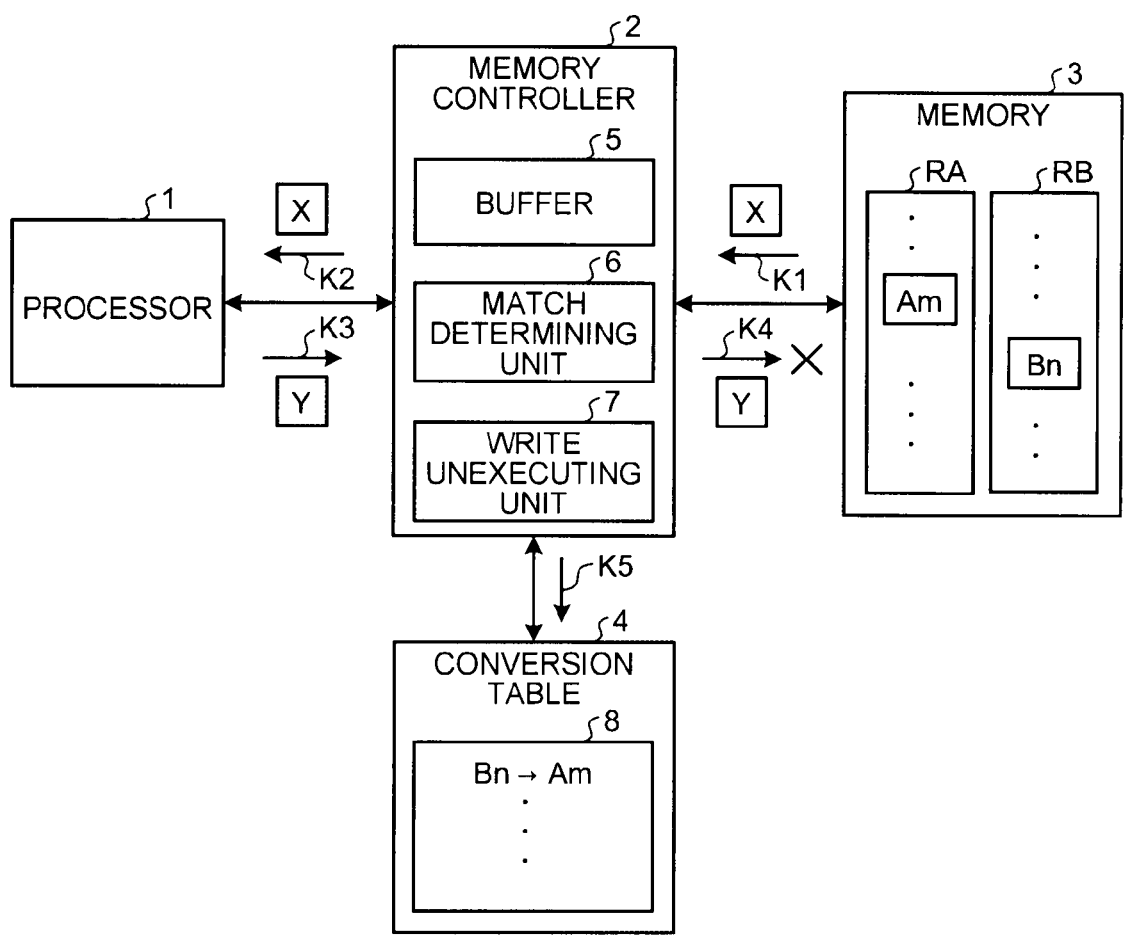
FIG. 1 is a schematic of a data write method performed by a memory controller according to a first embodiment of the present invention.

FIG. 1 is a schematic of a data write method performed by a memory controller according to a first embodiment of the present invention.

In FIG. 1, a processor 1 is connected to a memory 3 via a memory controller 2. The memory controller 2 is connected to a conversion table 4. The memory controller 2 writes data into the memory 3 based on a write request received from the processor 1, reads data from the memory 3 based on a read request received from the processor 1, and transfers the data to the processor 1. In response to a data write request from the processor 1, the memory controller 2 determines if there is overlapping data, and by preventing the overlapping data from being written into the memory 3, the amount of the memory 3 can be reduced.

More specifically, the memory controller 2 includes a buffer 5, a match determining unit 6, and a write unexecuting unit 7. The buffer 5 temporary stores therein data read out from the memory 3. The match determining unit 6 determines whether read-data X requested to be read from a memory region RA by the processor 1 is matched with write-data Y requested to be written into a memory region RB by the processor 1. The write unexecuting unit 7, if the read-data X requested to be read by the processor 1 is matched with the write-data Y requested to be written by the processor 1, prevents the write-data Y from being written into the memory region RB.

The conversion table 4 stores therein conversion data 8. In the conversion data 8, a corresponding relationship between an address Bn of the memory region RB of the write-data Y not written into the memory region RB, and an address Am of the memory region RA in which the read-data X matched with the write-data Y is registered.

On receiving a read request to read the read-data X from the address Am of the memory region RA issued by the processor 1, the memory controller 2 reads the read-data X from the address Am of the memory region RA (K1). The memory controller 2 then stores the read-data X read from the address Am of the memory region RA in the buffer 5, and transfers the read-data X to the processor 1 (K2).

On receiving the read-data X from the memory controller 2, the processor 1 generates write-data Y by processing the read-data X. The processor 1 then requests the memory controller 2 to write the write-data Y into the address Bn of the memory region RB (K3). The read-data X includes, for example, image data and audio data. The processing performed on the read-data X in the processor 1 includes image processing such as pixel interpolation, color conversion, contour correction, and filtering.

When the memory controller 2 receives a write request to write the write-data Y into the address Bn of the memory region RB from the processor 1, the match determining unit 6 determines whether the read-data X stored in the buffer 5 is matched with the write-data Y received from the processor 1.

The memory controller 2, if the read-data X stored in the buffer 5 is not matched with the write-data Y received from the processor 1, writes the write-data Y received from the processor 1 into the address Bn of the memory region RB.

If the read-data X stored in the buffer 5 is matched with the write-data Y received from the processor 1, the write unexecuting unit 7 prevents the write-data Y from being written into the address Bn of the memory region RB (K4). If the write-data Y requested to be written by the processor 1 is not written into the address Bn of the memory region RB, the memory controller 2 registers the corresponding relationship between the address Bn of the memory region RB of the write-data Y and the address Am of the memory region RA in which the read-data X matched with the write-data Y is registered, into the conversion table 4 (K5).

When the processor 1 issues an instruction to read the write-data Y requested to be written into the address Bn of the memory region RB, the memory controller 2 converts the address Bn of the memory region RB to the address Am of the memory region RA, by referring to the conversion table 4. Accordingly, the read-data X is read from the address Am of the memory region RA. The memory controller 2 then transfers the read-data X read from the address Am of the memory region RA to the processor 1, as the write-data Y instructed to read from the address Bn of the memory region RB by the processor 1.

Accordingly, in response to the data write request from the processor 1, it is possible to prevent the overlapping data from being written into the memory 3. It is also possible to read the data specified by the data read request issued by the processor 1. Accordingly, it is possible to reduce the amount of the memory 3 in which the data processed by the processor 1 is stored.

In the embodiment of FIG. 1, the memory controller 2 is separately provided from the processor 1. However, the memory controller 2 may be provided in the processor 1. In the embodiment of FIG. 1, the conversion table 4 is separately provided from the memory controller 2. However, the conversion table 4 may be provided in the memory controller 2. In the embodiment of FIG. 1, the buffer 5 is provided in the memory controller 2. However, the buffer 5 may be provided separately from the memory controller 2. In the embodiment of FIG. 1, the reading and writing of data is performed between the memory regions RA and RB in the same memory 3. However, the reading and writing of data can be performed between the different memories MA and MB accessible by the processor 1.

In the embodiment, if the read-data X requested to be read by the processor 1 is matched with the write-data Y requested to be written by the processor 1, the write-data Y is prevented from being written into the memory region RB. However, the write data requested to be written by the processor 1 may be compared with data already stored in the memory 3, and if the write data requested to be written by the processor is matched with the data already stored in the memory 3, the write data may be prevented from being written into the memory 3. In this case, the conversion table 4 may be registered with the corresponding relationship between the address of the write data requested to be written by the processor 1, and the address of the data already stored in the memory 3 and is matched with the write data.

In the embodiment, if the memory controller 2 does not write the write-data Y requested to be written by the processor 1 into the memory region RB, the conversion table 4 is provided to identify the address where the read-data X that matches with the write-data Y is stored in the memory region RA. However, a logic address may be assigned to the memory regions RA and RB. If the read-data X requested to be read by the processor 1 is not matched with the write-data Y requested to be written by the processor 1, the write-data Y can be written into the logic address of the memory region RB that matches with the logic address of the memory region RA of the read-data X requested to be read by the processor 1. If the read-data X requested to be read by the processor 1 is matched with the write-data Y requested to be written by the processor 1, it is possible to prevent the write-data Y from being written into the logic address of the memory region RB that matches with the logic address of the memory region RA of the read-data X requested to be read by the processor 1.

Second Embodiment

Figure 2:
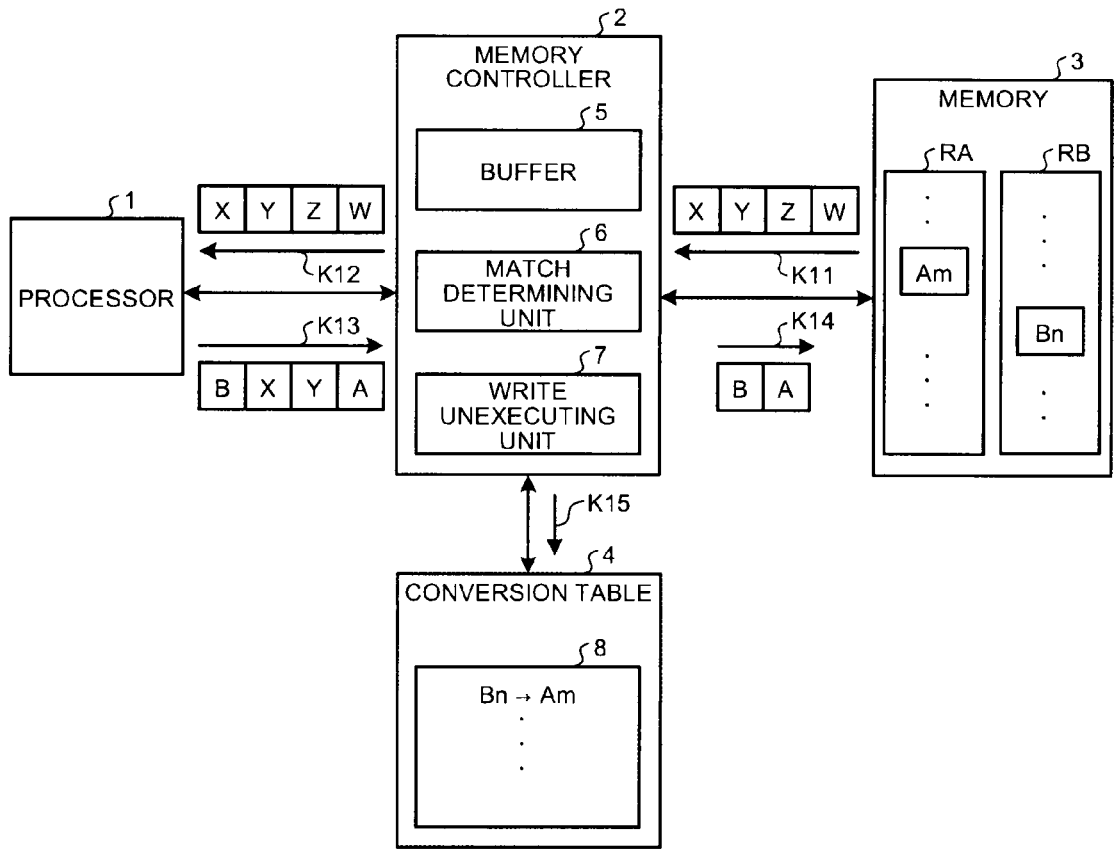
FIG. 2 is a schematic of a data write method performed by a memory controller according to a second embodiment of the present invention.

FIG. 2 is a schematic of a data write method performed by a memory controller according to a second embodiment of the present invention. In the second embodiment, SIMD is used as data to be read from and written into the memory 3. On using SIMD, if a part of the SIMD between the read data and the write data are matched with each other, it is possible to prevent the part of data from being written.

In other words, in FIG. 2, on receiving a read request to read read-data 'XYZW' from the address Am of the memory region RA issued by the processor 1, the memory controller 2 reads the read-data 'XYZW' from the address Am of the memory region RA (K11). 'XYZW' is SIMD in which data X, data Y, data Z, and data W are processed with a single command. The memory controller 2 stores the read-data 'XYZW' read from the address Am of the memory region RA into the buffer 5, and then transfers the read-data 'XYZW' to the processor 1 (K12).

On receiving the read-data 'XYZW' from the memory controller 2, the processor 1 generates write-data 'AYXB' by processing the read-data 'XYZW'. The processor 1 then requests the memory controller 2 to write the write-data 'AYXB' into the address Bn of the memory region RB (K13). 'AYXB' is SIMD in which data B, data X, data Y, and data A are processed with a single command.

When the memory controller 2 receives a write request to write the write-data 'AYXB' into the address Bn of the memory region RB from the processor 1, the match determining unit 6 determines whether the read-data 'XYZW' stored in the buffer 5 is matched with the write-data 'AYXB' received from the processor 1, with individual data.

If the data X and the data Y are matched between the read-data 'XYZW' stored in the buffer 5 and the write-data 'AYXB' received from the processor 1, the write unexecuting unit 7 prevents the write-data 'XY' in the write-data 'AYXB' from being written into the address Bn of the memory region RB. However, the write-data 'BA' is written into the address Bn of the memory region RB (K14). If the write-data 'AYXB' requested to be written by the processor 1 is not written into the address Bn of the memory region RB as it is, the memory controller 2 registers the corresponding relationship between the address Bn of the memory region RB of the write-data 'AYXB' and the address Am of the memory region RA in which the read-data 'XYZW' including a portion matching with the write-data 'AYXB' is stored, into the conversion table 4 (K15).

Accordingly, in response to the data write request from the processor 1, even if overlapping data is included in a part of the SIMD, it is possible to prevent the overlapping data from being written into the memory 3. It is also possible to read the data specified by the data read request issued by the processor 1. Subsequently, it is possible to reduce the amount of the memory 3 in which the data processed by the processor 1 is stored.

Third Embodiment

Figure 3:
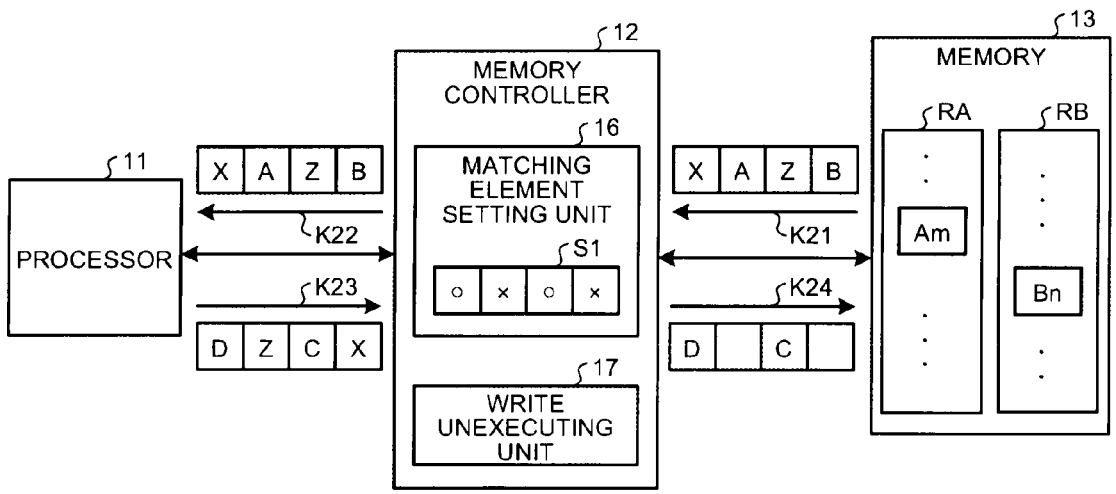
FIG. 3 is a schematic of a data write method performed by a memory controller according to a third embodiment of the present invention.

FIG. 3 is a schematic of a data write method performed by a memory controller according to a third embodiment of the present invention.

In FIG. 3, a processor 11 is connected to a memory 13 via a memory controller 12. The memory controller 12 writes data into the memory 13 based on a write request from the processor 11, reads data from the memory 13 based on a read request from the processor 11, and transfers the data to the processor 11. The memory controller 12, in response to a data write request from the processor 11, prevents overlapping data specified in advance from being written into the memory 13. Accordingly, it is possible to reduce the amount of the memory 13.

SIMD can be used as data to be read from and written into the memory 13. The memory controller 12 assigns a logic address to the memory regions RA and RB, and by specifying the logic address, it is possible to read data from the memory region RA and to write data into the memory region RB. To specify the data read out from the memory region RA and the data written into the memory region RB, the processor 11 can use an offset value (data that indicates the n-th number from the initial address) instead of an address. When an offset value is to be used, the processor 11 can set the offset value so that the values between the data read out from the read memory region RA and the data written into the memory region RB become the same.

More specifically, the memory controller 12 includes a matching element setting unit 16 and a write unexecuting unit 17. The matching element setting unit 16 presets a portion where the data requested to be read from the memory region RA by the processor 11 is matched with the data requested to be written into the memory region RB by the processor 11. The matching element setting unit 16 includes a matching pattern Si showing which pieces of data in the SIMD are matched, between the read data and the write data made of the SIMD. For example, the matching pattern SI can indicate that the odd-numbered data is matched but the even-numbered data is not matched between the SIMD. The matching pattern S1 can also indicate that the even-numbered data is matched but the odd-numbered data is not matched between the SIMD. The write unexecuting unit 17, in the write data requested to be written by the processor 11, can prevent a portion set by the matching element setting unit 16 from being written into the memory region RB.

On receiving a request to read read-data 'XAZB' from the memory region RA issued by the processor 11, the memory controller 12 reads the read-data 'XAZB' from the memory region RA (K21). When a reading position from the memory region RA is supplied by an offset value, the memory controller 12 converts the offset value to the address Am of the memory region RA, and reads the read-data 'XAZB' from the address Am. 'XAZB' is SIMD in which data X, data A, data Z, and data B are processed with a single command. The memory controller 12 then transfers the read-data 'XAZB' read from the address Am of the memory region RA to the processor 11 (K22).

On receiving the read-data 'XAZB' from the memory controller 12, the processor 11 generates write-data 'XCZD' by processing the read-data 'XAZB'. The processor 11 then requests the memory controller 12 to write the write-data 'XCZD' into the memory region RB (K23). 'XCZD' is SIMD in which data X, data C, data Z, and data D are processed with a single command.

When the memory controller 12 receives a write request to write the write-data 'XCZD' into the memory region RB from the processor 11, the write unexecuting unit 17 prevents the odd-numbered write-data 'XZ' indicated by the matching pattern S1 from being written into the memory region RB. However, the even-numbered write-data 'CD' is written into the memory region RB (K24). By using an offset value that is the same as that used to specify the reading position from the memory region RA, the processor 11 can specify the writing position into the memory region RB. When the writing position into the memory region RB is supplied by an offset value, the memory controller 12 converts the offset value to the address Bn of the memory region RB, and writes the write-data 'CD' into the address Bn.

On receiving an instruction to read the write-data 'XCZD' requested to be written into the memory region RB issued by the processor 11, the memory controller 12 converts the offset value supplied by the processor 11 at the time, to the address Am of the memory region RA and the address Bn of the memory region RB. The memory controller 12 then reads the read-data 'XAZB' from the address Am of the memory region RA and the read-data 'CD' from the address Bn of the memory region RB. The memory controller 12 extracts the odd-numbered read-data 'XZ' from the read-data 'XAZB', and transfers the read-data 'XCZD' in which the read-data 'XZ' is oddly numbered and the read-data 'CD' is evenly numbered, to the processor 11.

In this manner, in response to the data write request from the processor 11, even if overlapping data is included in a part of the SIMD, it is possible to prevent the data from being written into the memory 13, without comparing between the read data and the write data. It is also possible to read the data specified by the data read request issued by the processor 11, thereby preventing the increase of load applied to the memory controller 12. Accordingly, it is possible to reduce the amount of the memory 13 in which the data processed by the processor 11 is stored.

Fourth Embodiment

Figure 4:
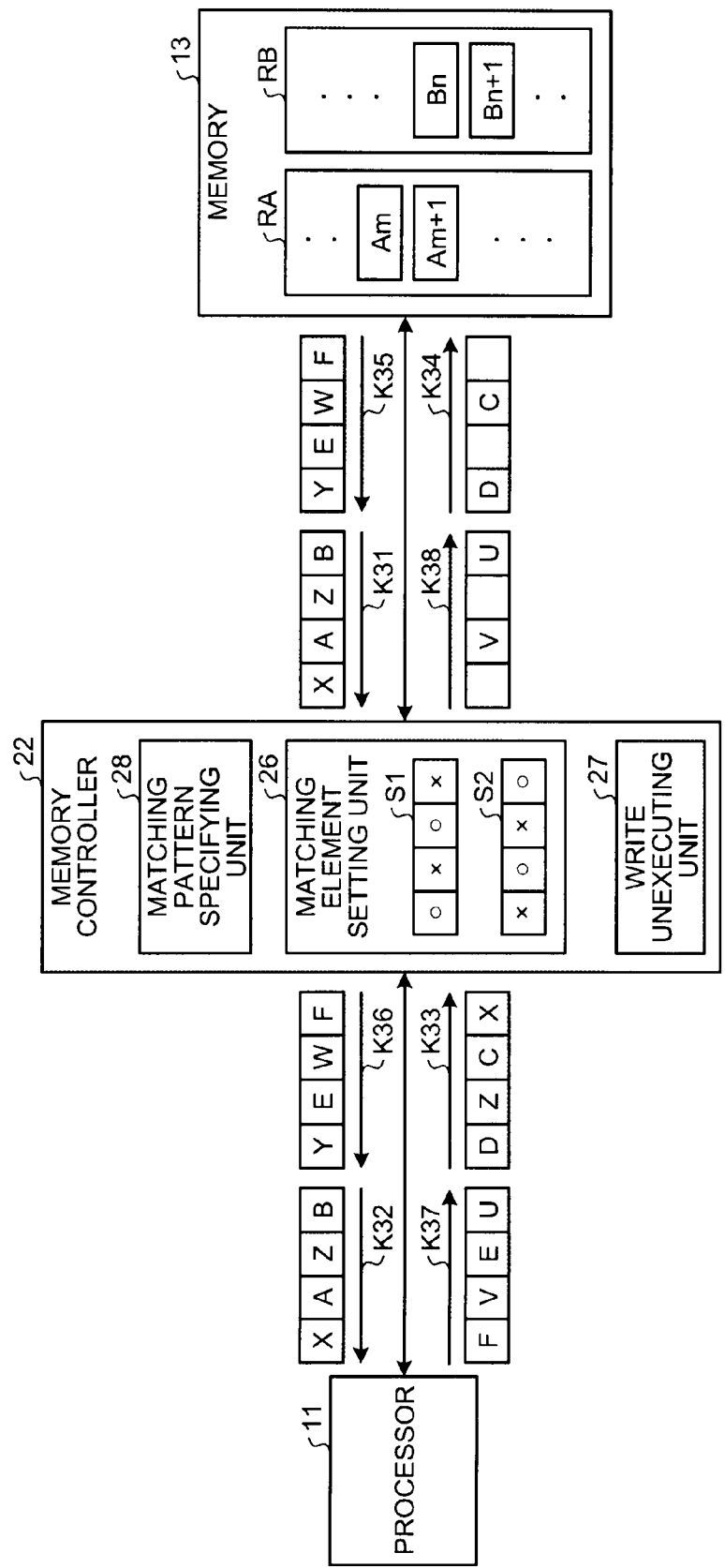
FIG. 4 is a schematic of a data write method performed by a memory controller according to a fourth embodiment of the present invention.

FIG. 4 is a schematic of a data write method performed by a memory controller according to a fourth embodiment of the present invention.

In FIG. 4, the processor 11 is connected to the memory 13 via a memory controller 22. The memory controller 22 writes data into the memory 13 based on a write request received from the processor 11, reads data from the memory 13 based on a read request received from the processor 11, and transfers the data to the processor 11. The memory controller 22, in response to a data write request from the processor 11, even if the position of the overlapping data is changed in the SIMD, prevents the overlapping data specified in advance from being written into the memory 13. Accordingly, it is possible to reduce the amount of the memory 13.

More specifically, the memory controller 22 includes a matching element setting unit 26, a write unexecuting unit 27, and a matching pattern specifying unit 28. The matching element setting unit 26 presets a plurality of matching patterns S1 and S2 that shows a portion where the read data requested to be read from the memory region RA by the processor 11 is matched with the write data requested to be written into the memory region RB by the processor 11. For example, the matching pattern S1 can indicate that the odd-numbered data is matched and the even-numbered data is not matched in the SIMD. The matching pattern S2 can indicate that the even-numbered data is matched and the odd-number data is not matched in the SIMD.

The matching pattern specifying unit 28 specifies the matching patterns S1 and S2 set in the matching element setting unit 26. For example, the matching pattern specifying unit 28, if an offset value supplied by the processor 11 is an odd number, specifies the matching pattern S1. If an offset value supplied by the processor 11 is an even number, the matching pattern specifying unit 28 specifies the matching pattern S2. The write unexecuting unit 27 prevents a portion set by the matching patterns S1 and S2 specified by the matching pattern specifying unit 28 in the write data requested to be written by the processor 11, from being written into the memory region RB.

On receiving a request to read the read-data 'XAZB' from the memory region RA issued by the processor 11, the memory controller 22 reads the read-data 'XAZB' from the memory region RA (K31). If the reading position from the memory region RA is supplied by an offset value, the memory controller 22 converts the offset value to the address Am of the memory region RA, and reads the read-data 'XAZB' from the address Am. The memory controller 22 then transfers the read-data 'XAZB' read from the address Am of the memory region RA to the processor 11 (K32).

On receiving the read-data 'XAZB' from the memory controller 22, the processor 11 generates write-data 'XCZD' by processing the read-data 'XAZB'. The processor 11 then requests the memory controller 22 to write the write-data 'XCZD' into the memory region RB (K33). If an offset value supplied by the processor 11, at the time when the read data 'XAZB' is requested to be read, is an odd number, the matching pattern specifying unit 28 can specify the matching pattern S1.

When the memory controller 22 receives a request to write the write-data 'XCZD' into the memory region RB from the processor 11, the write unexecuting unit 27 prevents the odd-numbered write-data 'XZ' indicated by the matching pattern S1 from being written into the memory region RB. However, the even-numbered write-data 'CD' is written into the memory region RB (K34). By using an offset value that is the same as that used to specify the reading position from the memory region RA, the processor 11 can specify the writing position into the memory region RB. When the writing position into the memory region RB is supplied by an offset value, the memory controller 22 converts the offset value to the address Bn of the memory region RB, and writes the write-data 'CD' into the address Bn.

Next, on receiving a request to read read-data 'YEWF' from the memory region RA issued by the processor 11, the memory controller 22 reads the read-data 'YEWF' from the memory region RA (K35). When the reading position from the memory region RA is supplied by an offset value, the memory controller 22 converts the offset value to an address Am+1 of the memory region RA, and reads the read-data 'YEWF' from the address Am+1. The memory controller 22 then transfers the read-data 'YEWF' read from the address Am+1 of the memory region RA to the processor 11 (K36).

On receiving the read-data 'YEWF' from the memory controller 22, the processor 11 generates write-data 'UEVF' by processing the read-data 'YEWF'. The processor 11 then requests the memory controller 22 to write the write-data 'UEVF' into the memory region RB (K37). If an offset value supplied by the processor 11, at the time when the read-data 'YEWF' is requested to be read, is an even number, the matching pattern specifying unit 28 can specify the matching pattern S2.

When the memory controller 22 receives a write request to write the write-data 'UEVF' into the memory region RB from the processor 11, the write unexecuting unit 27 prevents the even-numbered write-data 'EF' indicated by the matching pattern S2 from being written into the memory region RB. However, the odd-numbered write-data 'UV' is written into the memory region RB (K38). The processor 11 can specify the writing position into the memory region RB, by using an offset value that is the same as that used to specify the reading position from the memory region RA. When the writing position into the memory region RB is supplied by an offset value, the memory controller 22 converts the offset value to an address Bn+1 of the memory region RB, and writes the write-data 'UV' into the address Bn+1.

Accordingly, in response to the data write request from the processor 11, even if overlapping data is changed in the SIMD, it is possible to prevent the data from being written into the memory 13, without comparing between the read data and the write data. Accordingly, it is possible to read data specified by the data read request received from the processor 11, thereby preventing the increase of load applied to the memory controller 22. Subsequently, it is possible to reduce the amount of the memory 13 in which the data processed by the processor 11 is stored.

FIG. 5 is an example of data to which a matching element according to an embodiment of the present invention is set.

In FIG. 5, red pixel data, blue pixel data, and green pixel data of the CMOS sensor are respectively referred to as R, B, and G. In the image data, an odd-numbered row is arranged in a sequence of BGBGBG and so on, and an even-numbered row is arranged in a sequence of GRGRGR and so on.

The pixel data arranged in such a sequence is stored in the memory region RA, and the pixel data is read from the memory region RA as SIMD. After the green pixel data G is interpolated by the processor 11 in FIG. 4, the pixel data is written into the memory region RB.

In the odd-numbered row, read data 'BGBGBG' is read out as SIMD, and the green pixel data G is being interpolated, whereby write-data 'G'GG'GG'G' is generated. G' is interpolated green pixel data. Accordingly, the odd-numbered data in the write-data 'G'GG'GG'G' is new data generated by interpolation, and the even-numbered data in the write-data 'G'GG'GG'G' is the same as that of the even-numbered data in the read-data 'BGBGBG'.

In the even-numbered row, read-data 'GRGRGR' is read out as SIMD, and the green pixel data G is being interpolated, whereby generating write-data 'GG'GG'GG'' is generated. Accordingly, in the write-data 'GG'GG'GG'', the even-numbered data is new data generated by interpolation, and the odd-numbered data in the write-data 'GG'GG'GG'' is the same as that of the odd-numbered data in the read-data 'GRGRGR'.

When data is read out from the odd-number row, the matching pattern specifying unit 28 in FIG. 4 specifies the matching pattern S2, and has odd-numbered data 'G'G'G'' in the write-data 'G'GG'GG'G' written into the memory region RB. When data is read out from the even-numbered row, the matching pattern specifying unit 28 in FIG. 4 specifies the matching pattern S1, and has even-numbered data 'G'G'G'' in the write-data 'GG'GG'GG'' written into the memory region RB.

Accordingly, even if the position of the pixel data that changes between the even-numbered row and the odd-numbered row in the SIMD is different, in response to the write request of pixel data issued by the processor 11, it is possible to prevent overlapping pixel data from being written into the memory region RB. Accordingly, it is possible to reduce the amount of the memory 13.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory controller comprising:
    a matching element setting unit that presets a portion where read data requested to be read from a first memory region by a processor is matched with write data requested to be written into a second memory region by the processor; and
    a write unexecuting unit that, in the write data requested to be written by the processor, prevents a portion set by the matching element setting unit from being written into the second memory region,
    wherein the read data and the write data are single instruction multiple data (SIMD) and if a part of the SIMD is matched, the part of data is prevented from being written, and
    wherein the matching element setting unit indicates that odd-numbered data is matched and even-numbered data is not matched in the SIMD.

2. The memory controller according to claim 1, wherein the read data is pixel data.

3. The memory controller according to claim 2, wherein the processor generates the write data, by performing image processing on the read data read from the first memory region.

4. The memory controller according to claim 1, wherein the first memory region and the second memory region are assigned with a logic address.

5. The memory controller according to claim 4, wherein the read data read from the first memory region and the write data written into the second memory region are specified by using an offset value.

6. A memory controller comprising:
    a matching element setting unit that presets a portion where read data requested to be read from a first memory region by a processor is matched with write data requested to be written into a second memory region by the processor; and
    a write unexecuting unit that, in the write data requested to be written by the processor, prevents a portion set by the matching element setting unit from being written into the second memory region,
    wherein the read data and the write data are single instruction multiple data (SIMD), and if a part of the SIMD is matched, the part of data is prevented from being written, and
    wherein the matching element setting unit indicates that even-numbered data is matched and odd-numbered data is not matched in the SIMD.

7. The memory controller according to claim 6, wherein the read data is pixel data.

8. The memory controller according to claim 6, wherein the processor generates the write data, by performing image processing on the read data read from the first memory region.

9. The memory controller according to claim 6, wherein the first memory region and the second memory region are assigned with a logic address.

10. The memory controller according to claim 9, wherein the read data read from the first memory region and the write data written into the second memory region are specified by using an offset value.

11. A memory controller comprising:
    a matching element setting unit that presets a portion where read data requested to be read from a first memory region by a processor is matched with write data requested to be written into a second memory region by the processor;
    a write unexecuting unit that, in the write data requested to be written by the processor, prevents a portion set by the matching element setting unit from being written into the second memory region; and
    a matching pattern specifying unit that specifies a pattern in which a portion where the read data is matched with the write data is changed,
    wherein the read data and the write data are single instruction multiple data (SIMD), and if a part of the SIMD is matched, the part of data is prevented from being written,
    wherein the write unexecuting unit that, in the portion set by the matching element setting unit, prevents the portion specified by the matching pattern specifying unit from being written into the second memory region, and
    wherein the pattern includes
        a first pattern that indicates odd-numbered data is matched and even-number data is not matched in the SIMD, and
        a second pattern that indicates even-numbered data is matched and odd-numbered data is not matched in the SIMD.

12. The memory controller according to claim 11, wherein the read data is pixel data.

13. The memory controller according to claim 11, wherein the processor generates the write data, by performing image processing on the read data read from the first memory region.

14. The memory controller according to claim 11, wherein the first memory region and the second memory region are assigned with a logic address.

15. The memory controller according to claim 14, wherein the read data read from the first memory region and the write data written into the second memory region are specified by using an offset value.

* * * * *